United States Patent Office

3,336,240
Patented Aug. 15, 1967

3,336,240
METHOD FOR THE MANUFACTURE OF CATALYTICALLY ACTIVE CLAY
Henry Erickson, Park Forest, and Wayne L. Disegna, Markham, Ill., assignors to Sinclair Research, Inc., New York, N.Y., a corporation of Delaware
No Drawing. Filed Feb. 11, 1965, Ser. No. 431,972
4 Claims. (Cl. 252—455)

This invention pertains to a novel contact material and to contact processes which employ it. The contact material is a silicon oxide-aluminum oxide association to which a specified treatment has been applied. The material is useful in a number of practical applications, especially in hydrocarbon processing or other procedures where good steam stability is required. The novel process of this invention is remarkably effective in imparting hydrocarbon cracking ability to some natural clays of little or no cracking ability in their untreated state. Although methods have been developed for manufacturing hydrocarbon cracking catalysts from clay, these methods have, in general, been acid treatments of a fairly severe nature as opposed to the generally mild basic treatment of the instant invention. The process of this invention may also be used for upgrading of contact materials known to be of value in hydrocarbon cracking, even greater activity and product selectivity being given to cracking systems using the improved contact materials.

The process of this invention comprises treating an alumina-silica material of defined characteristics with an aqueous solution having a basic pH imparted by ammonium ions. The treatment apparently acts to replace impurities in the alumina-silica material or perhaps even some alumina with ammonium ions and, upon later high temperature treatment, ammonia is driven off leaving acid sites in the contact material which have a surprisingly high effect on catalytic cracking activity.

The starting alumina-silica material, as mentioned, may be a raw clay or a clay which has been previously treated for manufacture of a cracking catalyst or may be a synthetic gel or partially synthetic gel cracking catalyst. The starting material will often consist essentially of silicon oxide and aluminum oxide to the substantial exclusion of other materials except impurities. The impurities, in the case of naturally occurring materials such as raw clay, will usually be iron or other metals of atomic number 22 or more. In semi-processed clays or synthetic gel catalysts the impurity may be sodium or other material resulting from the processing. The impurities generally will comprise no more than about 2% of the starting material, preferably less than about 0.5%.

The starting material used in this invention may, in the palpably dry state, contain free or combined water up to about an equal weight of the solids non-volatile at below 1000° C., that is, up to about 50% of the weight of the dry starting silica-alumina material may be water. The proportions recited below are based on the non-volatile solids content, that is, on the basis of matter not volatile below about 1000° C.

The non-volatile portion of the starting material will generally contain about 5 to 90% alumina, preferably about 20 to 50%, the balance essentially silica. Clays such as kaolin and halloysite which contain about 35 to 50%, usually about 46% $Al_2O_3$ based on the total content of non-volatile matter, and synthetic gel "high alumina" cracking catalysts which have about 20 to 35% or more, usually about 25%, alumina are suitable starting materials for production of particulate contact solids according to the instant invention. The starting material will generally be used in a finely divided state achieved by precipitation or grinding; the particles often will be no greater than about 100 microns in size.

In the treatment with ammonium ions, the pH of the aqueous solution is frequently greater than about 7.5. The solution preferably is substantially free of any contaminant materials which would remain deposited on the contact material and tend to poison its cracking activity. Thus, materials such as sodium and other alkali metals are to be substantially excluded from the treating solution. The ammonium ions may be $NH_4+$ ions or organic substituted $NH_4+$ ions such as methyl ammonium and quaternary hydrocarbon ammonium radicals. The aqueous wash solution may be prepared by the addition of a dry reagent, or a concentrated aqueous solution of the reagent to water, preferably distilled or deionized water. Ammonia gas itself may be dissolved in the water. The reagent may be any water-soluble organic or inorganic ammonium compound such as ammonium carbonate, methylamine etc. and the solution is basic. An aqueous solution of ammonium hydroxide is highly preferred. The selected solute will be one which dissociates or ionizes in the aqueous solution to provide the required pH range of greater than 7 up to about 12, and which vaporizes or decomposes to vaporizable materials under the subsequent calcination treatment. Ammonium salts of acids such as nitric and acetic are generally to be avoided, however, because of their effect on the pH. Even ammonium or amine compounds of limited water solubility are usable in this invention due to the small concentration of ammonium ion needed. The preferred solutions have a pH of about 8 to 10.

The amount of ammonium ion in the solution is sufficient to give the desired effect described below and will often be in the range of about 1–25 or more pounds per ton of contact material treaded. 5 to 15 pounds is the preferred ammonium range but the use of more than about 10 pounds does not appear to increase subsequent activity unless it increases pH. The solution will often provide about 1 to 100% or more of ammonia based on the weight of the material to be treated and it has been found that a slurry containing about 25% solids in the solution is easy to work with.

The temperature of the solution does not appear to be significant in the amount of activity achieved, but usually may vary from below room temperature to the boiling point of water at the pressure used. Temperatures above about 215° F. require pressurized equipment, the cost of which does not appear to be justified. The contact time is sufficient to incorporate the desired amount of ammonia into the contact material. Short contact times for the ammonia washing, on the order of about 30 minutes to 2 hours, are preferably used and the time often may vary from about 10 minutes to 24 hours or more. After the ammonia wash the slurry can be filtered to give a cake which may be reslurried with water or rinsed in other ways, such as, for example, by a water wash on the filter, and the rinsing may be repeated, if desired, several times. The rising, of course, does not remove the essential ammonia incorporated into the contact material.

The ammonium treatment generally incorporates about 0.1 to 10% ammonia into the contact material, preferably about 0.5 to 2%. This is the amount of ammonia remaining in the contact material after drying to remove palpable water. A calcination treatment at a temperature of at least about 250° F., more usually about 750° F. to 1050° F. or higher serves to decompose all or a major amount of the ammonium ions present in the contact material. The number of ammonium ions decomposed is at least sufficient to provide acid sites suitable for the contact material to have activity in catalytic cracking. The calcination will not be conducted under conditions of temperature, time, etc., so severe as to cause heat deactivation—"dead-burning"—of the contact material.

Catalytically promoted methds for the chemical conversion of hydrocarbons include cracking, hydrocracking, reforming, hydroforming, etc. Such reactions generally are performed at elevated temperatures, for example, about 300 to 1200° F., more often about 600 to 1000° F. Feedstocks to these processes generally comprise normally liquid and solid hydrocarbons which at the temperature of the conversion reaction are generally in the fluid, i.e. liquid or vapor, state, and the products of the conversion frequently are lower boiling materials. The contact material of this invention may be employed as a superior catalyst for hydrocarbon cracking. It advantageously also may be used as a support for promoting metal or metal oxide such as group VI and/or group VIII metal materials. Such promoted catalysts are often used in hydrogenation processes.

Cracking of heavier hydrocarbon feedstocks to produce hydrocarbons of preferred octane rating boiling in the gasoline range is widely practiced and usually gives end products of fairly uniform composition. Cracking is ordinarily effected to produce gasoline as the most valuable product and is generally conducted at temperatures of about 750 to 1100° F., preferably about 850 to 950° F., at pressures up to about 2000 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range. For typical operations, the catalytic cracking of a hydrocarbon feed normally results in the conversion of about 50 to 60% of the feedstock into a product boiling in the gasoline boiling range.

The physical form of catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the 'fluid' process, gases are used to convey the catalyst and to keep it in the form of a dense turbulent bed which has no definite upper interface between a lower dense (solid) phase and an upper suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about one-half inch in diameter. When fresh, the minimum sized bead is generally about one-eighth inch. Other types of processes use other forms of catalyst such as tablets or extruded pellets.

The catalytic conversion system also usually includes a regeneration procedure in which the catalyst is contacted periodically with free oxygen-containing gas in order to restore or maintain the activity of the catalyst by removing the carbon and hydrocarbons deposited on the catalyst during the conversion operation and not removable by a simple "stripping," usually with inert gas, which ordinarily is inserted between the conversion and regeneration steps. The burning of deposits from the catalyst produces steam, to a greater or less extent, along with other oxidation products, which steam has a tendency to deactivate the cracking catalyst. The contact materials of this invention have been found to have superior resistance to this steam deactivation.

The invention will be better understood by reference to the following examples of the method and novel contact materials of this invention. These examples are illustrative only and should not be considered limiting.

Example I

A 100 gm. sample of kaolin clay from Georgia was added to a solution containing 200 cc. $H_2O$ and 150 cc. conc. $NH_4OH$, and having a pH of about 11. The mixture was then stirred 1½ hours, after which the clay was filtered out and dried for 15 hours at 300° F. The dried clay was then calcined at 1050° F. for 3 hours and then steamed 24 hours at 1150° F. Analysis of the finished contact material L showed a silica content of 64% and an alumina content of 35.3%. Before calcination the dried clay had an ammonium content of about 2.0%.

A batch of this contact material L having an average particle size of about 40 microns was used to crack a petroleum hydrocarbon East Texas gas oil fraction (feedstock B) having the following approximate characteristics.

| | | | | |
|---|---|---|---|---|
| Gravity (API) | 33-35° | IBP (° F.) | | 490-510 |
| Viscosity (SUS) at 100° F | 40-45 | 10% | | 530-550 |
| Aniline Point | 170-175° F | 50% | | 580-600 |
| Pour Point | 35-40° F | 90° | | 650-670 |
| Sulfur | 0.3% | EP | | 690-710 |

The figures of Table I represent average results in a series of test cracking cycles using catalyst L. This table also contains the results of cracking feedstock B under the same conditions with a sample of kaolin clay (Sample K) which had been prepared as sample L except for the ammonia treatment.

TABLE I

| | Catalyst | |
|---|---|---|
| | K | L |
| Relative Activity | 8.1 | 182 |
| Distillate plus Loss | 12.2 | 70 |
| Gas Factor | 2.09 | 0.68 |
| Coke Factor | 2.22 | 0.77 |
| Gas Gravity | 0.71 | 1.52 |

Example II

Table II, below reports on the results of cracking feedstock B according to the same test cracking technique as in Example I, using catalysts H and J. Catalyst J was part of a 100 gm. sample of halloysite clay which had been treated with ammonia solution and otherwise as sample L. Sample H was a non-ammonia-treated halloysite prepared as sample K. The cracking results were as follows:

TABLE II

| | Catalyst | |
|---|---|---|
| | H | J |
| Relative Activity | 8.4 | 67 |
| Distillate plus Loss | 13.4 | 46.5 |
| Gas Factor | 2.89 | 0.95 |
| Coke Factor | 2.67 | 0.79 |
| Gas Gravity | 0.59 | 1.38 |

Example III

Sample S was a synthetic gel "high alumina" (25% $Al_2O_3$, balance $SiO_2$) cracking catalyst having a particle size of about 40 microns. Sample T was a 100 gm. portion of this catalyst S which was added to a solution containing 200 cc. $H_2O$ and 150 cc. $NH_4OH$ and having a pH of about 11. The mixture was stirred for 1½ hours, then the catalyst was filtered and dried for 15 hours at 300° F. The dried catalyst containing about 1.2% ammonia was next calcined at 1050° F. for 3 hours and then steamed 24 hours at 1150° F. The test cracking results for this sample and for a portion of catalyst S which had been only calcined and steamed in the same manner as sample T are given in Table III.

TABLE III

|  | Catalyst | |
| --- | --- | --- |
|  | S | T |
| Relative Activity | 48.2 | 63.5 |
| Distillate plus Loss | 39.5 | 44.8 |
| Gas Factor | 0.98 | 0.92 |
| Coke Factor | 0.97 | 0.81 |
| Gas Gravity | 1.43 | 1.46 |

It can readily be seen that the contact materials of this invention have superior properties for hydrocarbon processing.

It is claimed:

1. A method for manufacture of a solid contact material which comprises treating an essentially catalytically inactive clay containing about 35 to 50% alumina, the balance of the non-volatile matter being essentially silica, with an aqueous solution to which a pH greater than 7 has been imparted by the presence therein of ammonium ions, for a time sufficent to give a material containing about 0.1 to 10% ammonia, and heating the ammonia-treated solid to a temperature of at least about 250° F. to decompose ammonium ions.

2. The method of claim 1 in which the clay is kaolin.

3. The method of claim 1 in which the clay is halloysite.

4. The method of claim 3 in which the pH is about 8 to 10.

References Cited

UNITED STATES PATENTS

| 2,430,289 | 11/1947 | Gary | 252—450 |
| 2,432,746 | 12/1947 | Gary et al. | 208—120 |
| 2,484,258 | 12/1949 | Webb et al. | 208—120 |
| 2,782,144 | 2/1957 | Pardee | 252—455 |

DELBERT E. GANTZ, *Primary Examiner.*

A. RIMENS, *Assistant Examiner.*